(12) United States Patent
Bartolomeo et al.

(10) Patent No.: US 11,150,992 B2
(45) Date of Patent: Oct. 19, 2021

(54) FILE ENTITY RELATIONSHIP MANAGEMENT AND SOURCE PRODUCT BACKUP

(71) Applicant: International Business Machines Corporation, Armonk, NY (US)

(72) Inventors: William J. Bartolomeo, Pine Plains, NY (US); Ryan Bertsche, Poughkeepsie, NY (US); Jeffrey Bisti, New Paltz, NY (US); Frank J. De Gilio, Poughkeepsie, NY (US); Jacky M. Doll, Poughkeepsie, NY (US); Danielle Judka, Duchtess County, NY (US); Emily M. Metruck, Poughkeepsie, NY (US); Philip Siconolfi, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 16/106,990

(22) Filed: Aug. 21, 2018

(65) Prior Publication Data
US 2020/0065194 A1 Feb. 27, 2020

(51) Int. Cl.
*G06F 11/14* (2006.01)
*G06F 16/11* (2019.01)

(52) U.S. Cl.
CPC ........ *G06F 11/1448* (2013.01); *G06F 16/122* (2019.01); *G06F 2201/84* (2013.01)

(58) Field of Classification Search
CPC ............. G06F 11/1448; G06F 2201/84; G06F 17/30082; G06F 16/122

USPC ........................................................ 707/645
See application file for complete search history.

(56) References Cited

U.S. PATENT DOCUMENTS

| | | | |
|---|---|---|---|
| 6,442,753 B1 * | 8/2002 | Gerard | G06F 9/4488 717/170 |
| 7,363,633 B1 * | 4/2008 | Goldick | G06F 11/1448 707/999.202 |
| 8,589,449 B2 | 11/2013 | Kaplan et al. | |
| 8,639,665 B2 | 1/2014 | Berman et al. | |

(Continued)

FOREIGN PATENT DOCUMENTS

EP 1349089 A2 10/2003

OTHER PUBLICATIONS

Mell et al.; "The NIST Definition of Cloud Computing—Recommendations of the National Institute of Standards and Technology"; U.S. Department of Commerce, National Institute of Standards and Technology; Sep. 2011; 7 pages.

*Primary Examiner* — Hosain T Alam
*Assistant Examiner* — Robert F May
(74) *Attorney, Agent, or Firm* — Cantor Colburn LLP; Tihon Poltavets

(57) ABSTRACT

A computer-implemented method for recording file dependencies. A non-limiting example of the computer-implemented method includes creating, by the processor, a new inter-dependencies object in an inter-dependencies registry and writing, by the processor, an inter-dependency relationship between a first file and a second file from which the first file depends to the inter-dependency object in the inter-dependencies registry. The computer-implemented method further provides, by the processor, the inter-dependencies registry to a system upon receiving a call to backup the system.

12 Claims, 6 Drawing Sheets

(56) References Cited

U.S. PATENT DOCUMENTS

| | | | |
|---|---|---|---|
| 8,914,428 B2 | 12/2014 | Rooks et al. | |
| 9,037,587 B2 * | 5/2015 | Joukov | G06F 16/285 |
| | | | 707/737 |
| 9,081,792 B1 | 7/2015 | Williams et al. | |
| 9,355,120 B1 | 5/2016 | Slik et al. | |
| 10,503,822 B1 * | 12/2019 | Spencer | G06F 40/197 |
| 2003/0217027 A1 * | 11/2003 | Farber | G06F 16/21 |
| 2007/0130229 A1 | 6/2007 | Anglin et al. | |
| 2014/0187239 A1 * | 7/2014 | Friend | H04L 67/06 |
| | | | 455/426.1 |
| 2014/0304235 A1 | 10/2014 | Rooks et al. | |
| 2015/0169225 A1 | 6/2015 | Curley et al. | |
| 2015/0186021 A1 * | 7/2015 | Hamburg | G06F 3/04842 |
| | | | 715/753 |
| 2016/0019224 A1 | 1/2016 | Ahn et al. | |
| 2016/0196324 A1 * | 7/2016 | Haviv | G06F 3/0649 |
| | | | 707/626 |
| 2016/0246687 A1 | 8/2016 | Stark et al. | |
| 2017/0212811 A1 * | 7/2017 | Kashnikov | G06F 16/113 |

\* cited by examiner

FILE ENTITY RELATIONSHIP MANAGEMENT AND SOURCE PRODUCT BACKUP

BACKGROUND

The present invention generally relates to file structures, and more specifically, to file entity relationship management and source product backup.

As modern PCs make the transition from Hard Disk Drives (HDD) to Solid State Drives (SDD), storage space is once again a priority. This constraint is not unique to the PC market, but any place where storage comes at a great cost with regards to price, space, bandwidth, power consumption, drive read/write cycles, or time.

SUMMARY

Embodiments of the present invention are directed to a computer-implemented method for recording file dependencies. A non-limiting example of the computer-implemented method includes creating, by the processor, a new inter-dependencies object in an inter-dependencies registry and writing, by the processor, an inter-dependency relationship between a first file and a second file from which the first file depends to the inter-dependency object in the inter-dependencies registry. The computer-implemented method further provides, by the processor, the inter-dependencies registry to a system upon receiving a call to backup the system.

Additional embodiments of the present invention are directed to a system. The system includes a processor and memory coupled to the processor, the memory having stored therein instructions that when executed cause the processor to create a new inter-dependencies object in an inter-dependencies registry. The instructions also cause the processor to write an inter-dependency relationship between a first file and a second file from which the first file depends to the inter-dependency object in the inter-dependencies registry and to provide the inter-dependencies registry to a system upon receiving a call to backup the system.

Additional embodiments of the invention are directed to a computer program product for recording relationships between files. The computer program product includes a computer readable storage medium having program instructions embodied therewith. The program instructions are executable by a processor to cause the processor to create a new inter-dependencies object in an inter-dependencies registry. The computer program product further includes instructions to cause the processor to write an inter-dependency relationship between a first file and a second file from which the first file depends to the inter-dependency object in the inter-dependencies registry and to provide the inter-dependencies registry to a system upon receiving a call to backup the system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
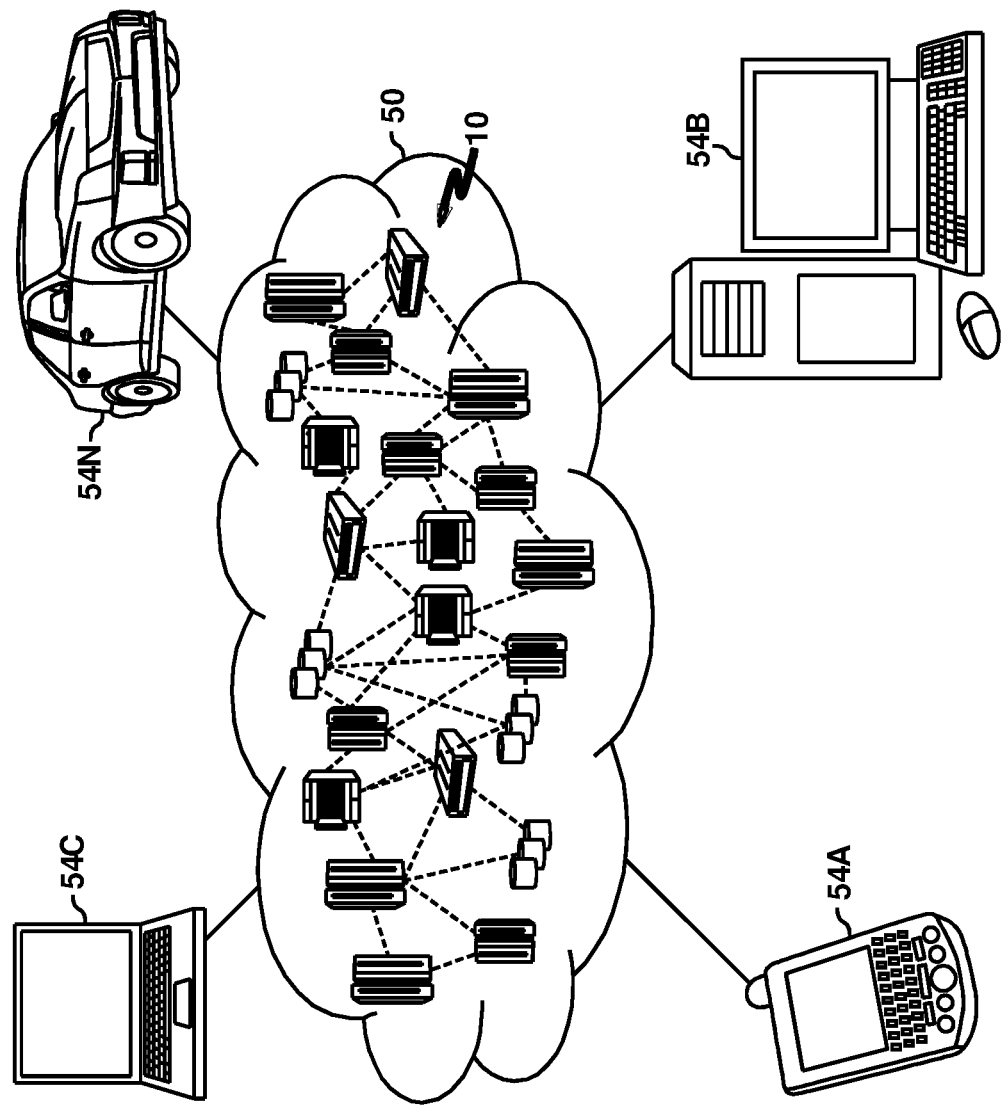
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
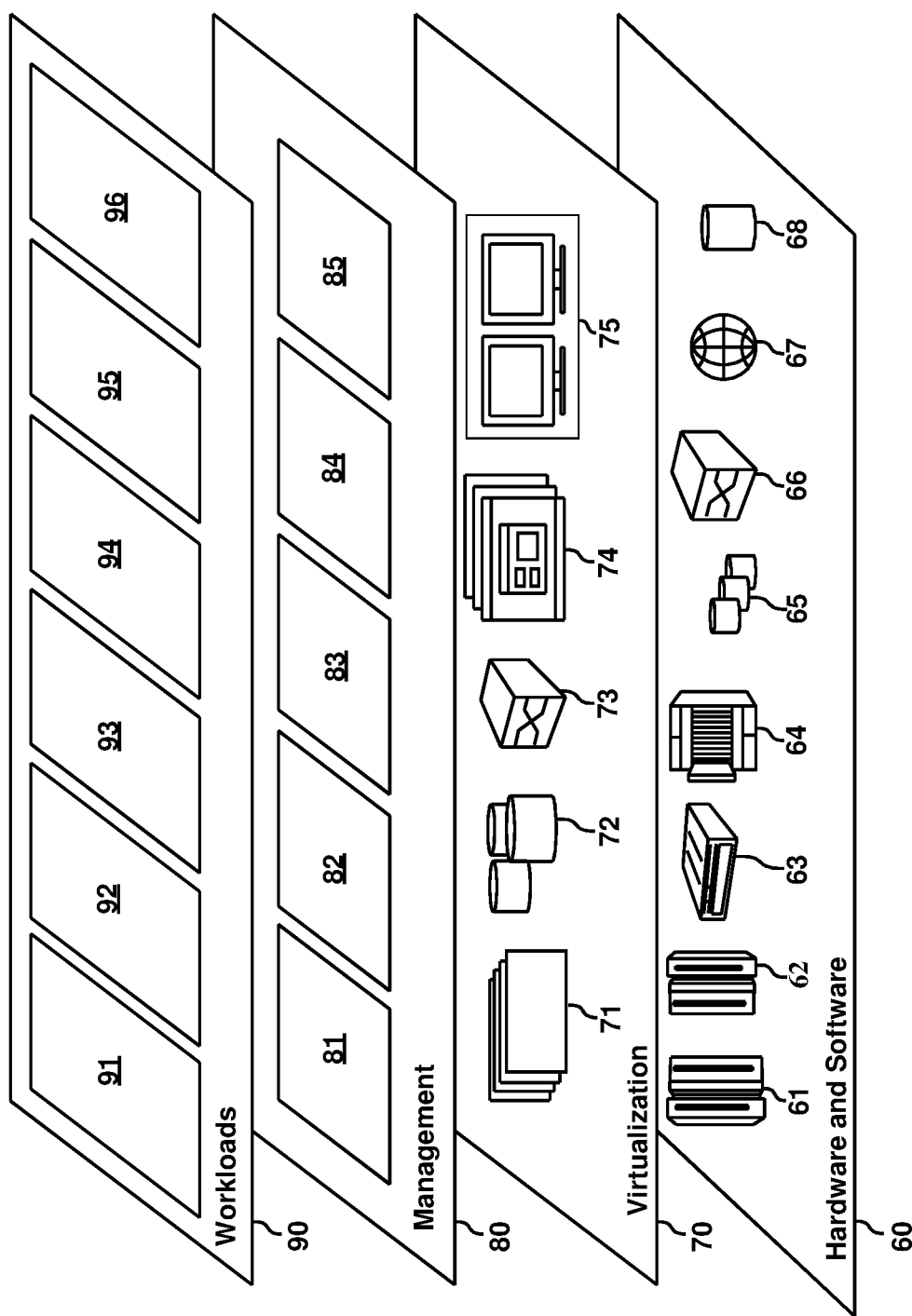
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and file relationship management 96.

Various embodiments of the invention are described herein with reference to the related drawings. Alternative embodiments of the invention can be devised without departing from the scope of this invention. Various connections are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in order to save time and resources, it is useful to have a view of a filesystem that includes importance, or priority of persistence. The concept of file entity relationship is not new. Solutions exist today that allow users to explicitly specify which files they want to ignore during backups, but they do not effectively allow the ability to draw more complex relationships that would cater to more complex use cases. When this functionality does exist, it is done on a case-by-case basis, not in a manner that can easily be leveraged by the operating system or other applications.

Turning now to an overview of the aspects of the invention, one or more embodiments of the invention address the above-described shortcomings of the prior art by providing systems that identify relationships between files. Exemplary embodiments of the present invention reduce unnecessary computer resource usage by identifying a system-wide policy that highlights entity relationships between files, where one file, or set of files, is a direct result of another file or set of files. By identifying relationships between files, for example, that a first file serves as an input to a program that outputs a second file, and identifying those relationships in a manner accessible system-wide, it become only necessary to back up the first file, and not the second file, in order to restore a system. This is a significant technical improvement in computer systems over existing systems that do not have system-wide access to relationship information. In contrast to existing systems, exemplary embodiments of the present invention record inter-dependency relationships between files in an interdependencies registry that is accessible to the system, so that the system can determine which files are necessary for backup.

Embodiments of the invention focus on the writing of entity relationships between files to entity relationship metadata. The metadata will not just hold a pointer from one file to another file, but also an associated rule, or action that describes the relationship between the files. To demonstrate this process, take the example of file compression. When looking to reduce the size of a file, or group of files, it is common practice to compress or zip those files into a single file that has a reduced storage size. In most cases, a successful compression will leave both the source file or files and the compressed result on the disk. After this compression process is done, there is neither record of the source of that compressed file, nor record of whether there exists a compressed version of the source files.

It is the intention of exemplary embodiments of this invention to impose a computer-implemented method for the compression application, in this example, to be able to define the relationship between the source and compressed resultant. Specifically, the application would write an entity relationship, signifying a relationship between the source files and the resultant compressed output. The metadata would then contain the relationship between source files and the compressed file. This metadata, being in a readable standard format, could then be read by outside applications, which could in turn apply rules on its interaction with these files based on the relationship described in the metadata.

Another example of this process would be video editing projects. Video editing applications often involve multiple copies of large files over multiple stages of the build process. One may start with large, uncompressed RAW files, and they may be compressed by an editing application. Those intermediate media files may then generate smaller sized thumbnails of that same media file for display purposes. Then there are project files that describe the combinations of media files and how they come together to form a final product. Then there are the final rendered output files, and then different media compression versions of that final end media. All of these intermediary files currently take up space, and the operating system and other applications have no way of knowing how they are related.

Using exemplary embodiments of the present invention, the application would describe relationships between each of the files in the file entity relationship metadata as it writes them to the filesystem. The thumbnail preview of uncompressed image would be the low priority file in a relationship with the RAW image. Consequently, the project file would be the high-priority source of the final video file. All of these relationships are written via the file relationship metadata, so any generic program can observer the relationship between files when acting on them. This is a flexible system, where the application or user accessing the filesystem can choose what to do with the information about the file relationships that are stored in the metadata.

This mechanism of describing file relations on a filesystem basis using metadata unlocks potential for applications and users to define rules based on that relationship information that is not available on a standard file system. The only solutions today are based on using folder structures that are specific to an application that created those files, which has a limited set of information. This metadata system allows the information to be read and acted upon by all entities that have access to the filesystem. Additionally, embodiments of the invention allow for one file entity relationship to extend another file entity relationship, enabling a dynamic and versatile ecosystem.

Figure 3:
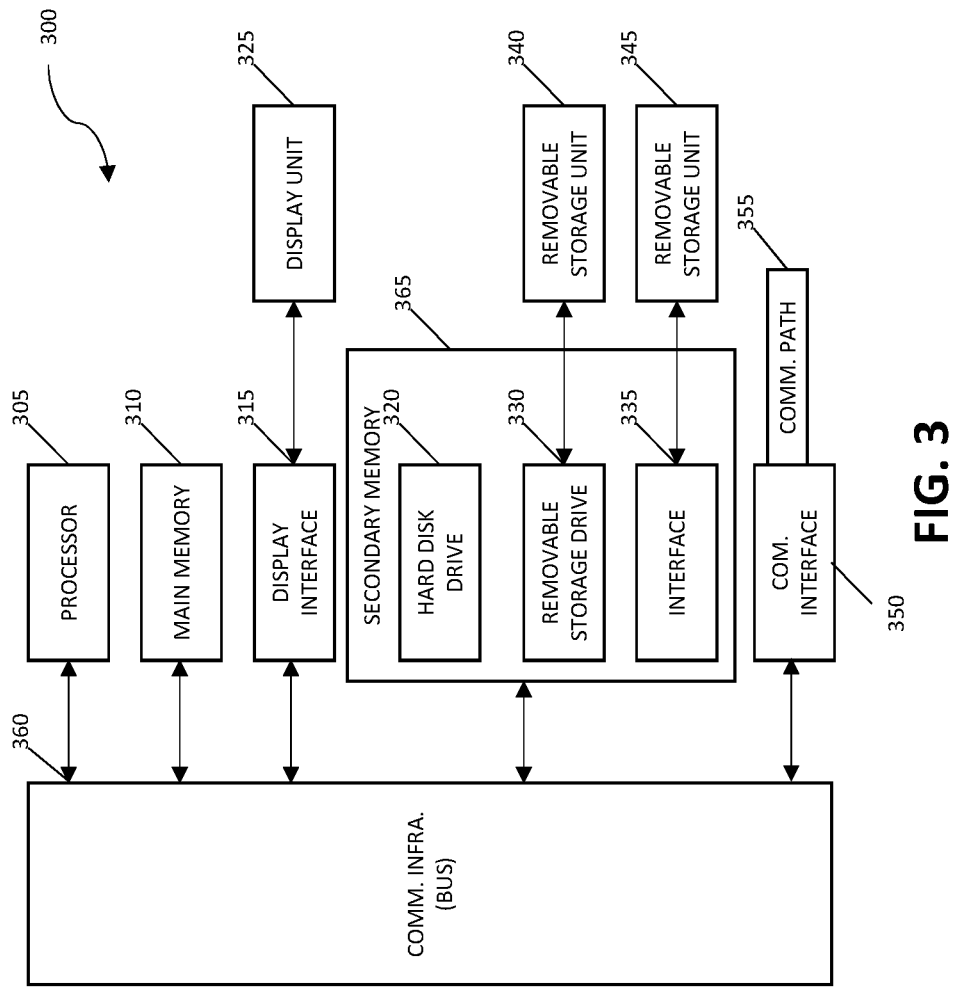
FIG. 3 depicts a high level block diagram computer system 300, which can be used to implement one or more aspects of the present invention.

Turning now to a more detailed description of aspects of the present invention, FIG. 3 depicts a high level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
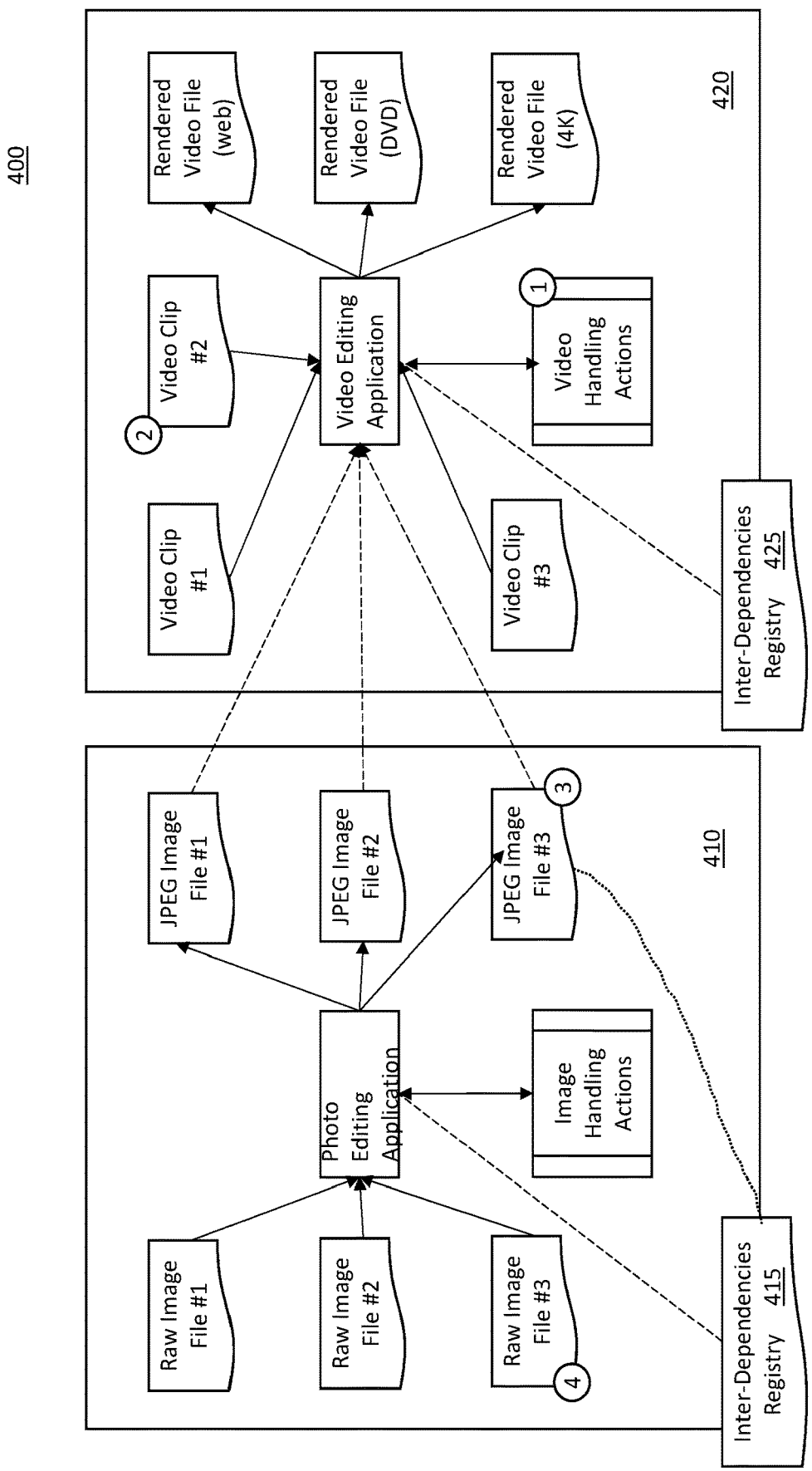
FIG. 4 depicts two software programs that take advantage of inter-dependencies registries according to an embodiment of the present invention.

FIG. 4 depicts two software programs that take advantage of inter-dependencies registries according to an embodiment of the present invention. An inter-dependencies registry stores objects which contain the relationships between a first file and a second file dependent upon the first file. In an exemplary embodiment, each program may maintain its own inter-dependencies registry, or there may be a single inter-dependencies registry in a system. FIG. 4 illustrates files and their inter-dependencies 400, as well as inter-dependencies registries, for a photo editing application map 410 and a video editing application map 420.

In the figure, file interdependency goes from left to right. For example, the RAW image files are required to assemble the JPEG files; the JPEG files are required to assemble the rendered video files. These are separate entities, with their own processes. The relationships are tracked in the Inter-Dependencies Registries 415 and 425, which could be embodied as a centralized facility or distributed files which are considered part of the filesystem. The registries are created and update by the application, in parallel to creation and maintenance of associated project files.

In the photo editing application map 410, three raw image files, RAW Image File #1, RAW Image File #2, and RAW Image File #3 are inputs to a photo editing application. The RAW Image File #1 is the input to generate the JPEG Image File #1. The RAW Image File #2 is the input to generate the JPEG Image File #2. The RAW Image File #3 is the input to generate the JPEG Image File #3. A project file is maintained by the Image Handling Actions block that tracks dependencies between the RAW image files and the JPEG image files. The photo editing application communicates with an Inter-Dependencies Registry 415 to store an object for each file-file relationship or dependency. Thus, Inter-Dependencies Registry 415 stores an object recording that JPEG Image File #1 is dependent upon RAW Image File #1, which is independent of any other file. Inter-Dependencies Registry 415 stores an object recording that JPEG Image File #2 is dependent upon RAW Image File #2, which is independent of any other file. Inter-Dependencies Registry 415 stores an object recording that JPEG Image File #3 is dependent upon RAW Image File #3, which is independent of any other file.

Thus, when the system is performing a backup operation it only needs to look at the Inter-Dependencies Registry 415 to determine that the minimal files needing to be backed up are the three RAW image files. The JPEG image files can be recreated after a restore from backup operation. The system can traverse the Inter-Dependencies Registry 415 to determine which image files are independent and form the foundation of the dependent files. This is a significant technical improvement to computer systems at present that are not aware of these dependencies and are forced to either have human intervention to specify which files to back up, or are forced to do a brute-force backup of all files.

In the video editing application map 420, three video clips, Video Clip #1, Video Clip #2, and Video Clip #3 are inputs to a video editing application. The Video Clip #1, Video Clip #2, and Video Clip #3 are the inputs to generate the Rendered Video File for the web, the Rendered Video File for DVD, and the Rendered Video File for 4K use. A project file is maintained by the Video Handling Actions block that tracks dependencies between the output files and input files. The photo editing application communicates with an Inter-Dependencies Registry 425 to store an object for each file-file relationship or dependency. Thus, Inter-Dependencies Registry 425 stores an object recording that Video Clips #1, #2, and #3, as well as JPEG Image Files #1, #2, and #3 are the source input files for output files: the Rendered Video File for the web, the Rendered Video File for DVD, and the Rendered Video File for 4K use.

Thus, when the system is performing a backup operation it only needs to look at the Inter-Dependencies Registry 425 to determine that the minimal files needing to be backed up are the three video clips and the three JPEG files. As the JPEG files come from the RAW Image files, the Inter-dependencies Registry 415 informs the system that the JPEG files do not need to be backed up, but the RAW files do. The video files can be recreated after a restore from backup operation. The system can traverse the Inter-Dependencies Registry 425 to determine which image files are independent and form the foundation of the dependent files.

For the following description, please note the circled "1," "2," "3," and "4" in the figure. At 1, a video file is created which creates a project file and a new inter-dependencies object which is stored in Inter-Dependencies Registry 425. At 2, individual video clips are added to the projected are noted in the registry as input files required for re-creation of the rendered video output files. At 3, rendered JPEG files are added to the video project, which have their own inter-dependency information stored in Inter-Dependencies Registry 415. At 4, the a computer-implemented method recursively traverses the tree until it reaches files that are independent, i.e. files that have no inter-dependencies with earlier files. This produces a more complete view of the structure of the file entity relationship mapping without requiring one project to depend entirely and explicitly on another.

Figure 5:
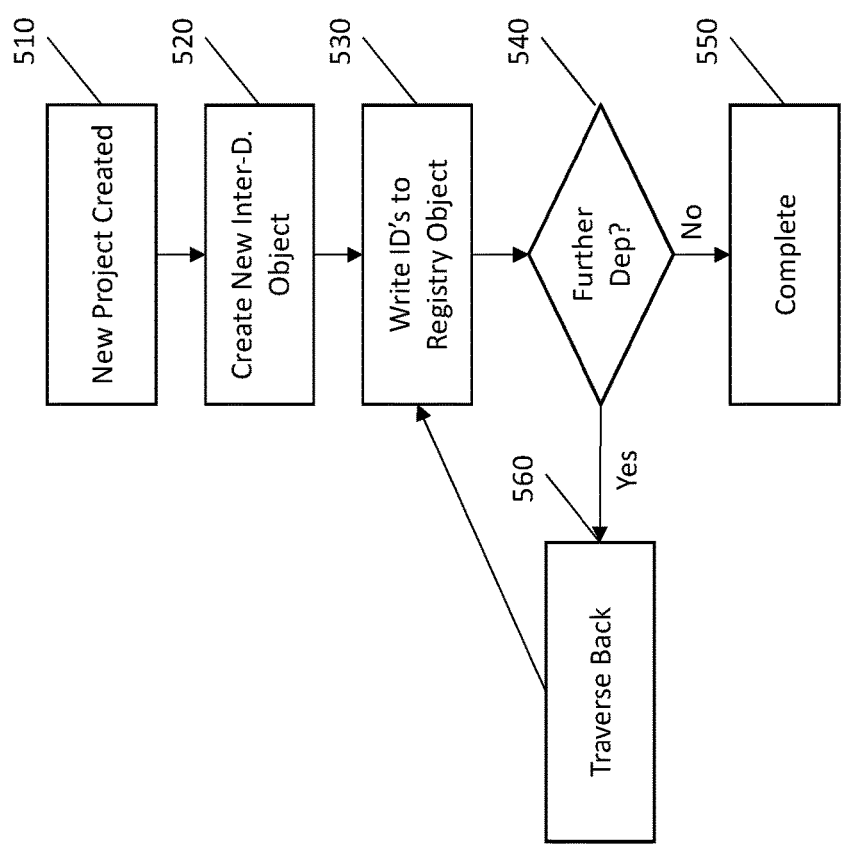
FIG. 5 depicts a flowchart of a computer-implemented method for storing interdependency information to be used for a backup operation according to an embodiment of the present invention.

FIG. 5 depicts a flowchart of a computer-implemented method for storing interdependency information to be used for a backup operation according to an embodiment of the present invention. Upon creation of a new project (stage 510), a processor creates a new inter-dependency object in an inter-dependencies registry (stage 520). Inter-dependencies between output files and input files are written to the inter-dependencies registry by the processor (stage 530). A check is made by the processor to see if those input files have further dependencies (stage 540). If not, the computer-implemented method is complete (stage 550). If so, the processor traverses back to find those files from which the dependent files depend (stage 560). Flow then returns to stage 530, where these inter-dependencies are then written by the processor to the registry object.

Figure 6:
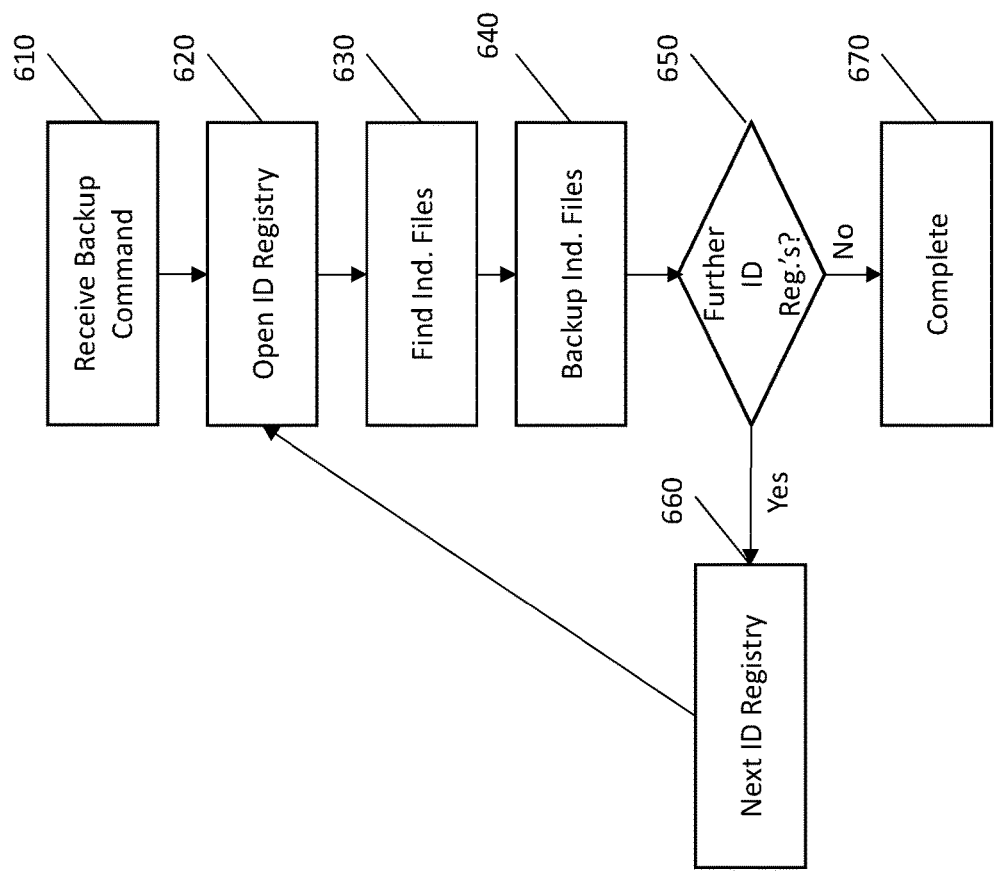
FIG. 6 depicts a flowchart of a computer-implemented method for a backup operation according to an embodiment of the present invention.

FIG. 6 depicts a flowchart of a computer-implemented method for a backup operation according to an embodiment of the present invention. The system receives a backup command (stage 610). The processor opens a first inter-dependencies registry (stage 620). The processor traverses the registry to find the independent files, i.e., ones that are not dependent upon other files (stage 630). The independent files are backed up by the processor (stage 640). The processor checks to see whether there are other inter-dependencies registries that have not yet been backed up (stage 650). If there are, the next inter-dependencies registry is selected by the processor (stage 660) and flow continues back to stage 620. If not, the backup is complete (stage 670).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method, comprising:
  performing, by a processor, a backup operation for a system that executes a plurality of applications, the plurality of applications including:
    a first application having an associated first inter-dependencies registry utilized by the first application to document that a first output file output by the first application depends from a first input file input to the first application, wherein the first application edits the first input file to generate the first output, a second application having an associated second inter-dependencies registry utilized by the second application to document that a second output file output by the second application depends from a second input file input to the second application, wherein the second application edits the second input file to generate the second output file, and wherein one of the first application and the second application is an image editing application and the other one of the first application and the second application is a video editing application, the performing comprising:

traversing the first and second inter-dependencies registries;

determining, based at least in part on the traversing, that the first output file depends from the first input file, that the second output file depends from the second input file, and that the first output file and the second input file are the same file; and in response to the determining, backing up the first input file and not backing up the first output file, the second input file and the second output file.

2. The computer-implemented method of claim 1, further comprising determining, based at least in part on the traversing, whether the first input file depends from a third file.

3. The computer-implemented method of claim 2, wherein the performing further comprises backing up the third file in place of the first input file in response to determining that the first input file depends from the third file.

4. A system, comprising:

a processor, memory coupled to the processor, the memory having stored therein instructions that when executed perform operations comprising:

performing a backup operation for a system that executes a plurality of applications, the plurality of applications including:

a first application having an associated first inter-dependencies registry utilized by the first application to document that a first output file output by the first application depends from a first input file input to the first application, wherein the first application edits the first input file to generate the first output, a second application having an associated second inter-dependencies registry utilized by the second application to document that a second output file output by the second application depends from a second input file input to the second application, wherein the second application edits the second input file to generate the second output file, and wherein one of the first application and the second application is an image editing application and the other one of the first application and the second application is a video editing application, the performing comprising:

traversing the first and second inter-dependencies registries;

determining, based at least in part on the traversing, that the first output file depends from the first input file, that the second output file depends from the second input file, and that the first output file and the second input file are the same file; and in response to the determining, backing up the first input file and not backing up the first output file, the second input file and the second output file.

5. The system of claim 4, wherein the operations further comprise determining, based at least in part on the traversing, whether the first input file depends from a third file.

6. The system of claim 5, wherein the performing further comprises backing up the third file in place of the first input file in response to determining that the first input file depends from the third file.

7. A computer program product for recording relationships between files, the computer program product comprising a computer readable storage medium having program instructions embodied therewith, the program instructions executable by a processor to cause the processor to perform operations comprising:

performing a backup operation for a system that executes a plurality of applications, the plurality of applications including:

a first application having an associated first inter-dependencies registry utilized by the first application to document that a first output file output by the first application depends from a first input file input to the first application, wherein the first application edits the first input file to generate the first output, a second application having an associated second inter-dependencies registry utilized by the second application to document that a second output file output by the second application depends from a second input file input to the second application, wherein the second application edits the second input file to generate the second output file, and wherein one of the first application and the second application is an image editing application and the other one of the first application and the second application is a video editing application, the performing comprising:

traversing the first and second inter-dependencies registries;

determining, based at least in part on the traversing, that the first output file depends from the first input file, that the second output file depends from the second input file, and that the first output file and the second input file are the same file; and in response to the determining, backing up the first input file and not backing up the first output file, the second input file and the second output file.

8. The computer program product of claim 7, wherein the operations further comprise to determining, based at least in part on the traversing, whether the first input file depends from a third file in the file system.

9. The computer program product of claim 8, wherein the performing further comprises backing up the third file in place of the first input file in response to determining that the first input file depends from the third file.

10. The method of claim 1, wherein the first application and the second application execute on different processors.

11. The system of claim 4, wherein the first application and the second application execute on different processors.

12. The computer program product of claim 7, wherein the first application and the second application execute on different processors.

* * * * *